May 30, 1967 F. B. SCHELHORN 3,322,588
METHOD FOR MAKING HEAVY GAUGE PLASTIC SHEETS
Filed Dec. 30, 1963
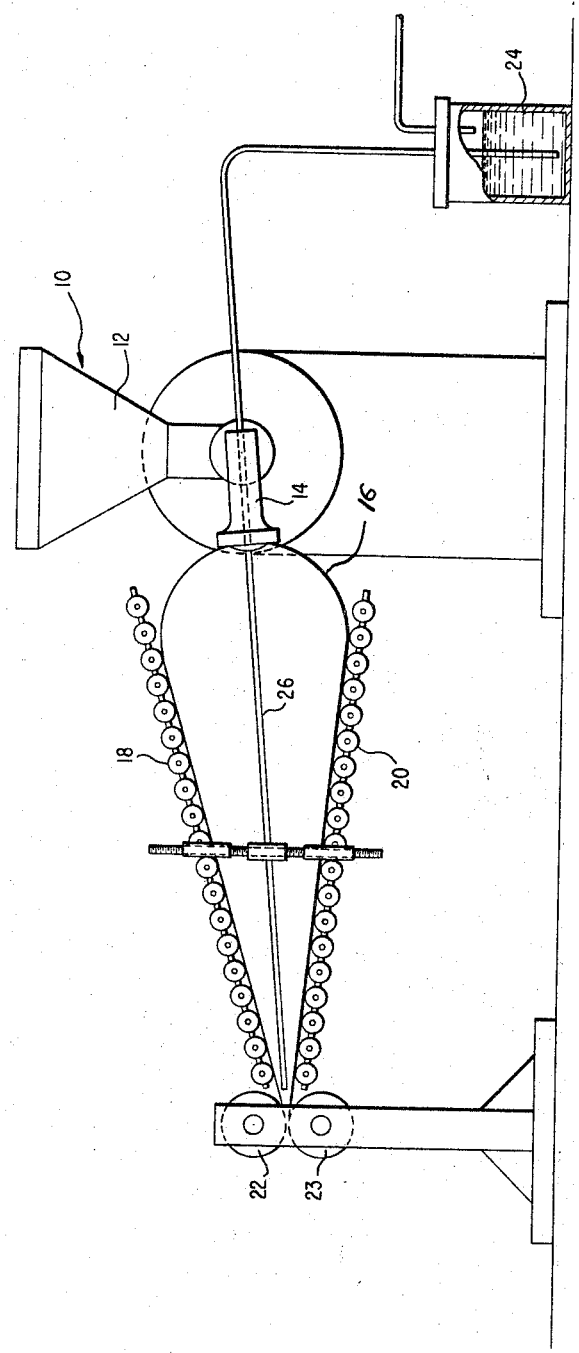
INVENTOR.
FREDERICK B. SCHELHORN
BY
W. A. Schaich
ATTORNEY

United States Patent Office 3,322,588
Patented May 30, 1967

3,322,588
METHOD FOR MAKING HEAVY GAUGE PLASTIC SHEETS
Frederick B. Schelhorn, Savannah, Tenn., assignor to Owens-Illinois, Inc., a corporation of Ohio
Filed Dec. 30, 1963, Ser. No. 334,276
3 Claims. (Cl. 156—244)

This invention relates to the manufacture of plastic sheet material and more particularly to the manufacture of heavy gauge, cellular plastic sheets.

In the manufacture of plastic film or sheets, it is conventional to extrude the plastic in tubular form. While the tube is still in the thermoplastic state as it leaves the extrusion die, it is inflated and cooled, after which it is flattened between rollers. Since the wall thickness of extruded plastic tubing is limited to a maximum of ⅛ of an inch, other methods have heretofore been employed to obtain sheets of heavier gauge.

The primary object of this invention is to provide a method and apparatus for manufacturing heavy gauge plastic sheet material from extruded tubing.

A further object is to provide a method and apparatus for extruding cellular plastic tubing and making heavy gauge laminated sheet therefrom in a single, continuous operation.

In achievement of the foregoing objects, cellular plastic material, such as foamed polystyrene, is extruded in tubular form, inflated, and thereafter progressively flattened between converging sets of rollers which finally direct the tube between a pair of squeeze rolls to bring the inner walls of the flattened tube together in surface to surface contact. In order to form a laminated sheet of double the thickness of the wall of the tubing, an adhesive conduit extends from a supply of adhesive through the extrusion die and terminates just short of the nip of the squeeze rolls. Thus, a suitable adhesive is applied to the inner wall of the tubing as it is directed between the squeeze rolls to cause the inner walls of the flattened tubing to adhere together and form a laminated sheet having a thickness of up to ¼ of an inch.

Other objects and advantages of the invention will become apparent from the following description taken in connection with the accompanying drawing wherein the single figure diagrammatically illustrates apparatus embodying the invention.

With reference to the drawing, extruding apparatus 10 includes a hopper 12 for receiving foamable plastic material to be extruded through an extrusion die 14 of conventional construction. The plastic material is extruded through die 14 in the form of a seamless tube 16 and is inflated as it leaves the mouth of die 14 in the manner disclosed, for example, in U.S. Patent 2,917,217. The inflated tube 16 is then progressively flattened between converging sets of rolls 18 and 20 which direct the tube into the nip of a pair of squeeze rolls 22, 23 to bring the opposed inner walls of the flattened tubing together into surface to surface contact.

A suitable adhesive, such as polyvinyl acetate, or a volatile solvent, is applied to the inner walls of tubing 16 through a conduit 26, having one end connected with a pressurized adhesive container 24. Conduit 26 extends through the extrusion die with its outlet end positioned within the inflated tubing near the nip of rolls 22, 23.

Fluid pressure may be introduced into the container 24 to force the adhesive through conduit 26 where it is deposited on the inner wall of the tubing just prior to the tube being flattened between rollers 22, 23. Squeeze rolls 22, 23 are preferably supported at a level below the extrusion die in order to provide a pool of adhesive in the tube just prior to its passing into the nip of the squeeze rolls.

The flow of adhesive is maintained at a rate sufficient to make up usage of the adhesive. After passing through rolls 22, 23, the adhesive causes the inner surfaces of the flattened tube to adhere together to form a laminated sheet of double thickness, the thickness of each layer being substantially the same. Additional pressure over that encountered as the tube passes between rollers 20 is not necessary to bond the layers together.

While I have described and illustrated one embodiment of my invention, I wish it understood that I do not intend to be restricted solely thereto, but that I do intend to cover all modifications thereof which would be apparent to one skilled in the art and which come within the scope and spirit of the invention.

What is claimed is:
1. A process for preparing a heavy gauge, laminated, thermoplastic sheet which comprises the steps of extruding cellular thermoplastic tubing, inflating the tubing to a selected diameter, applying an adhesive material to the inner wall of the tubing, and subsequently flattening the tubing to form a bonded laminated sheet having a thickness double the wall thickness of the inflated extruded tubing.

2. The process defined in claim 1 wherein said cellular thermoplastic tubing is foamed polystyrene, and wherein said adhesive material is polyvinyl acetate.

3. In a process for preparing cellular thermoplastic sheet material including the steps of extruding cellular thermoplastic tubing from a die, inflating the tubing to a selected diameter, and subsequently flattening the inflated tubing by passing the tubing between a pair of nip rolls, the improvement comprising the steps of directly a supply of a liquid bonding agent through a tube extending through said die into said inflated tubing and discharging the bonding agent from said tube adjacent said nip rolls, and maintaining a flow of said bonding agent through said tube sufficient to maintain a pool of bonding material in said tube just prior to its passing between said nip rolls to assure an even and complete coating of the interior walls of the tube and thereby form a heavy gauge bonded laminated cellular thermoplastic sheet having a thickness double the wall thickness of the extruded tubing.

References Cited

UNITED STATES PATENTS

| 2,558,323 | 2/1954 | Johnson | 18—14 |
| 2,936,792 | 5/1960 | MacCracken | 156—78 |
| 3,065,097 | 11/1962 | Zupic et al. | 117—18 |
| 3,159,698 | 12/1964 | Suh et al. | 264—210 |
| 3,172,930 | 3/1965 | Johnson et al. | 18—14 |

FOREIGN PATENTS 813,311  5/1959  Great Britain.

EARL M. BERGERT, *Primary Examiner.*
T. R. SAVOIE, *Assistant Examiner.*